(12) United States Patent
Numajiri et al.

(10) Patent No.: US 7,905,707 B2
(45) Date of Patent: Mar. 15, 2011

(54) PITCH ACTUATOR FOR WIND TURBINE GENERATOR, AND WIND TURBINE GENERATOR

(75) Inventors: Tomohiro Numajiri, Nagasaki (JP); Masahiro Kawai, Nagasaki (JP); Seita Seki, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 51 days.

(21) Appl. No.: 12/445,969

(22) PCT Filed: Apr. 24, 2008

(86) PCT No.: PCT/JP2008/057911
§ 371 (c)(1),
(2), (4) Date: Apr. 20, 2009

(87) PCT Pub. No.: WO2008/146557
PCT Pub. Date: Dec. 4, 2008

(65) Prior Publication Data
US 2009/0317254 A1 Dec. 24, 2009

(30) Foreign Application Priority Data
May 25, 2007 (JP) ................................. 2007-139434

(51) Int. Cl.
*F03D 9/00* (2006.01)
(52) U.S. Cl. ..................... 416/155; 416/156; 416/157 R; 416/157 B; 415/4.2; 415/4.4
(58) Field of Classification Search .................. 416/147, 416/155, 156, 157 R, 157 B, 158; 415/4.1, 415/4.3, 4.5
See application file for complete search history.

(56) References Cited

U.S. PATENT DOCUMENTS

| | | | |
|---|---|---|---|
| 4,201,514 A | 5/1980 | Huetter | |
| 4,431,375 A * | 2/1984 | Carter et al. | 416/132 B |
| 4,534,705 A * | 8/1985 | Selestam et al. | 416/162 |
| 5,584,655 A * | 12/1996 | Deering | 416/31 |
| 6,465,901 B2 * | 10/2002 | Croes | 290/55 |

FOREIGN PATENT DOCUMENTS

| | | |
|---|---|---|
| DE | 2851720 A1 | 6/1980 |
| JP | 05149237 | 6/1993 |
| JP | 2002276535 A | 9/2002 |

OTHER PUBLICATIONS

International Search Report from International Application No. PCT/JP2008/057911, filed Apr. 24, 2008 (WO 2008/146557).

* cited by examiner

*Primary Examiner* — Igor Kershteyn
(74) *Attorney, Agent, or Firm* — Kanesaka Berner & Partners, LLP (57) ABSTRACT

Provided are a pitch actuator for a wind turbine generator and a wind turbine generator that can be prevented from losing their reliability. Provided are a cylinder (12) and a rod (13) that rotate a wind turbine rotor blade about an axis thereof relative to a rotor head to change a pitch angle; a cylinder bearing (14, 15) supporting the cylinder (12) so as to be rotatable relative to the rotor head about a first rotation axis (L1) extending substantially parallel to the axis of the wind turbine rotor blade and about a second rotation axis (L2) extending in a direction crossing both the first rotation axis (L1) and the axis of the cylinder (12) and the rod (13); and a rod bearing (16) rotatably supporting an end of the rod (13) on an end surface of the wind turbine rotor blade.

6 Claims, 6 Drawing Sheets

PITCH ACTUATOR FOR WIND TURBINE GENERATOR, AND WIND TURBINE GENERATOR

CROSS-REFERENCE TO RELATED APPLICATIONS

The present Application is based on International Application No. PCT/JP2008/057911, filed on Apr. 24, 2008, which in turn corresponds to Japanese Application No. 2007-139434 filed on May 25, 2007, and priority is hereby claimed under 35 USC §119 based on these applications. Each of these applications are hereby incorporated by reference in their entirety into the present application.

TECHNICAL FIELD

The present invention relates to pitch actuators for wind turbine generator and also to wind turbine generator.

BACKGROUND ART

Known wind turbines used for wind turbine generator include those having wind turbine rotor blades with a fixed pitch angle and those having wind turbine rotor blades with a variable pitch angle.

An example of a known mechanism for changing the pitch angle of the above wind turbine rotor blades is a mechanism by which linear movement of a rod in a hydraulic cylinder is converted into rotation of a wind turbine rotor blade about the axis thereof (see, for example, Patent Document 1).

Besides the mechanism described in Patent Document 1 above, a variable-pitch configuration is known in which a hydraulic cylinder is supported on a rotor head so as to be rotatable about a single axis by a trunnion structure while an end of a rod is supported on a wind turbine rotor blade so as to be rotatable about a single axis.

This variable-pitch configuration holds the hydraulic cylinder and the rod so as to be rotatable about the trunnion structure in a plane perpendicular to the axis of the wind turbine rotor blade. Because the end of the rod is supported at a distance from the axis of the wind turbine rotor blade, linear movement of the rod is converted into rotation of the wind turbine rotor blade about the axis thereof.

Patent Document 1:
Japanese Unexamined Patent Application, Publication No. HEI-5-149237

DISCLOSURE OF INVENTION

In this pitch actuation mechanism, however, the joint structure between the trunnion structure and the hydraulic cylinder is more susceptible to deformation as the stroke of the hydraulic cylinder and the rod is extended for some reason, such as increasing the size of wind turbine generator, and can therefore experience a higher load acting about the axis perpendicular to the rotation axis of the trunnion structure.

In addition, a force acting on a larger wind turbine rotor blade can deform the root of the wind turbine rotor blade, or the rotor head itself, thus imposing a higher load acting about the axis perpendicular to the rotation axis of the trunnion structure.

Such a high load wears a seal around the hydraulic cylinder and imposes a higher structural load on the trunnion structure, thus causing a problem in that the pitch-actuating mechanism can lose its reliability in the long term.

In addition to the above problem, care must be taken in assembly of the pitch actuation mechanism to prevent, for example, wear of the seal around the hydraulic cylinder because of strict requirements for parallelism with the rotation surface of the wind turbine rotor blade.

An object of the present invention, which has been made to solve the above problems, is to provide a pitch actuator for a wind turbine generator and a wind turbine generator that can be prevented from losing their reliability.

To achieve the above object, the present invention provides the following solutions.

A first aspect of the present invention provides a pitch actuator for a wind turbine generator, including a cylinder and a rod that rotate a wind turbine rotor blade about an axis thereof relative to a rotor head to change a pitch angle; a cylinder bearing supporting the cylinder so as to be rotatable relative to the rotor head about a first rotation axis extending substantially parallel to the axis of the wind turbine rotor blade and about a second rotation axis extending in a direction crossing both the first rotation axis and the axis of the cylinder and the rod; and a rod bearing rotatably supporting an end of the rod on an end surface of the wind turbine rotor blade.

In the first aspect of the present invention, the cylinder and the rod are supported so as to be rotatable about the first rotation axis, which is substantially parallel to the axis of the wind turbine rotor blade, and about the second rotation axis, which crosses the first rotation axis. Hence, for example, a force acting on the cylinder and the rod due to strain occurring at the joint between the rotor head and the wind turbine rotor blade when the wind turbine rotor blade receives wind power is absorbed as the cylinder and the rod rotate about the second rotation axis.

On the other hand, when the cylinder and the rod rotate the wind turbine rotor blade about the axis thereof by extension and retraction to change the pitch angle, the cylinder and the rod rotate about the first rotation axis as the wind turbine rotor blade rotates.

Accordingly, the cylinder bearing can absorb a force acting in such a direction as to bend the cylinder and the rod to prevent accelerated wear of, for example, a seal around the cylinder. In addition, the assembly tolerance required for assembly of the pitch actuator of the present invention can be alleviated.

In the above invention, the cylinder bearing preferably includes a first cylinder bearing including first trunnions extending from the cylinder substantially parallel to the first rotation axis and first brackets rotatably supporting the first trunnions; and a second cylinder bearing including second trunnions extending from the first brackets substantially parallel to the second rotation axis and second brackets rotatably supporting the second trunnions.

By doing so, the cylinder and the rod are supported so as to be rotatable about the first rotation axis by the first cylinder bearing while the cylinder, the rod, and the first cylinder bearing are supported so as to be rotatable about the second rotation axis by the second cylinder bearing.

Therefore, a force acting on the cylinder and the rod due to strain occurring at the joint between the rotor head and the wind turbine rotor blade is absorbed as the cylinder, the rod, and the first cylinder bearing rotate about the second rotation axis. When the pitch angle of the wind turbine rotor blade is changed, on the other hand, the cylinder and the rod rotate about the first rotation axis as the wind turbine rotor blade rotates.

In the above invention, the rod bearing is preferably a spherical bearing.

By doing so, because a spherical bearing is used as the rod bearing, the force acting in such a direction as to bend the cylinder and the rod is also absorbed between an end of the rod and the wind turbine rotor blade by the rod bearing. This more reliably prevents accelerated wear of, for example, the seal around the cylinder and more significantly alleviates the assembly tolerance required for assembly of the pitch actuator of the present invention.

A second aspect of the present invention provides a wind turbine generator including a plurality of wind turbine rotor blades that receive wind power; a rotor head that supports the wind turbine rotor blades so as to be rotatable about the axes thereof and that are rotated by the wind turbine rotor blades; pitch actuators according to the above invention; and electricity-generating equipment that generates electricity as the rotor head rotates.

In the second aspect of the present invention, because the pitch actuators according to the first aspect of the present invention are used, the pitch actuators are prevented from losing their reliability, so that the wind turbine generator can be prevented from losing its reliability.

In the pitch actuator for a wind turbine generator according to the first aspect of the present invention and the wind turbine generator according to the second aspect, a force acting on the cylinder and the rod due to strain occurring at the joint between the rotor head and the wind turbine rotor blade is absorbed as the cylinder and the rod rotate about the second rotation axis. On the other hand, when the pitch angle is changed, the cylinder and the rod rotate about the first rotation axis as the wind turbine rotor blade rotates. That is, the cylinder bearing absorbs a force acting in such a direction as to bend the cylinder and the rod, so that the benefit of preventing the pitch actuator from losing its reliability is provided.

EXPLANATION OF REFERENCE SIGNS

1: wind turbine generator
4: rotor head
6: wind turbine rotor blade
7: electricity-generating equipment
11: pitch actuator
12: cylinder
13: rod
14: first cylinder bearing (cylinder bearing)
15: second cylinder bearing (cylinder bearing)
16: rod bearing
L1: inner axis (first rotation axis)
21: cylinder trunnion (first trunnion)
22: inner bracket (first bracket)
L2: outer axis (second rotation axis)
31: bracket trunnion (second trunnion)
32: outer bracket (second bracket)

BEST MODE FOR CARRYING OUT THE INVENTION

A wind turbine generator according to an embodiment of the present invention will now be described with reference to FIGS. 1 to 6.

Figure 1:
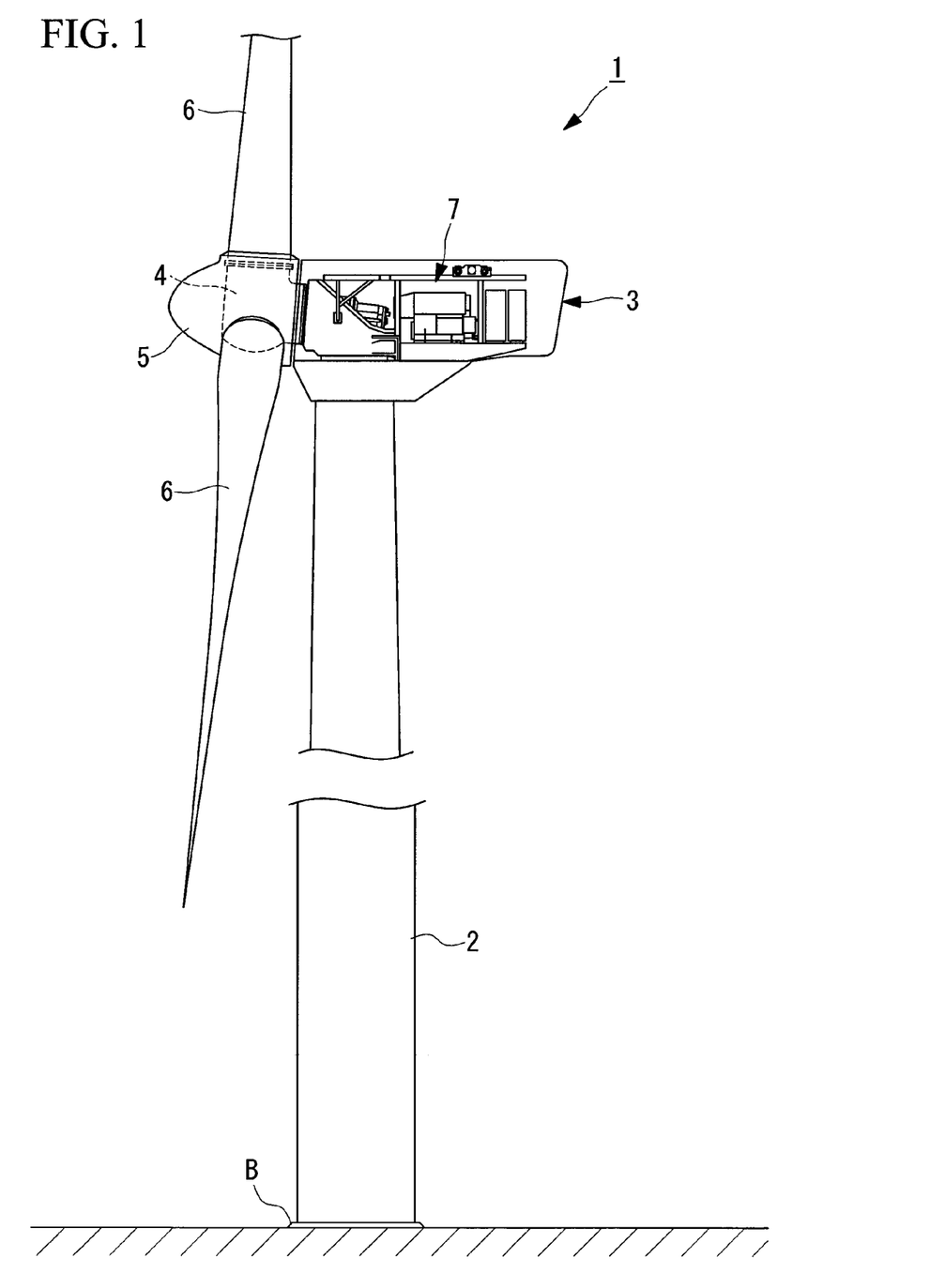
FIG. 1 is a diagram illustrating the structure of a wind turbine generator according to an embodiment of the present invention.

FIG. 1 is a diagram illustrating the structure of the wind turbine generator according to this embodiment.

As shown in FIG. 1, a wind turbine generator 1 generates electricity by wind power. The wind turbine generator 1 includes a tower 2 disposed upright on a foundation B, a nacelle 3 disposed at the top end of the tower 2, a rotor head 4 disposed on the nacelle 3 so as to be rotatable about a substantially horizontal axis, a head capsule 5 covering the rotor head 4, a plurality of wind turbine rotor blades 6 attached to the rotor head 4 radially around the rotation axis thereof, and electricity-generating equipment 7 that generates electricity as the rotor head 4 rotates.

Although an example in which three wind turbine rotor blades 6 are disposed is described in this embodiment, the number of wind turbine rotor blades 6 is not limited to three; two or more than three wind turbine rotor blades 6 may be disposed, and the number is not particularly limited.

The tower 2, as shown in FIG. 1, is a pillar structure extending upward (toward the top in FIG. 1) from the foundation B and is constituted of, for example, a plurality of units coupled together in the vertical direction. The nacelle 3 is disposed on the topmost portion of the tower 2. If the tower 2 is constituted of a plurality of units, the nacelle 3 is disposed on the topmost unit.

The nacelle 3, as shown in FIG. 1, rotatably supports the rotor head 4 and accommodates the electricity-generating equipment 7, which generates electricity as the rotor head 4 rotates.

Figure 2:
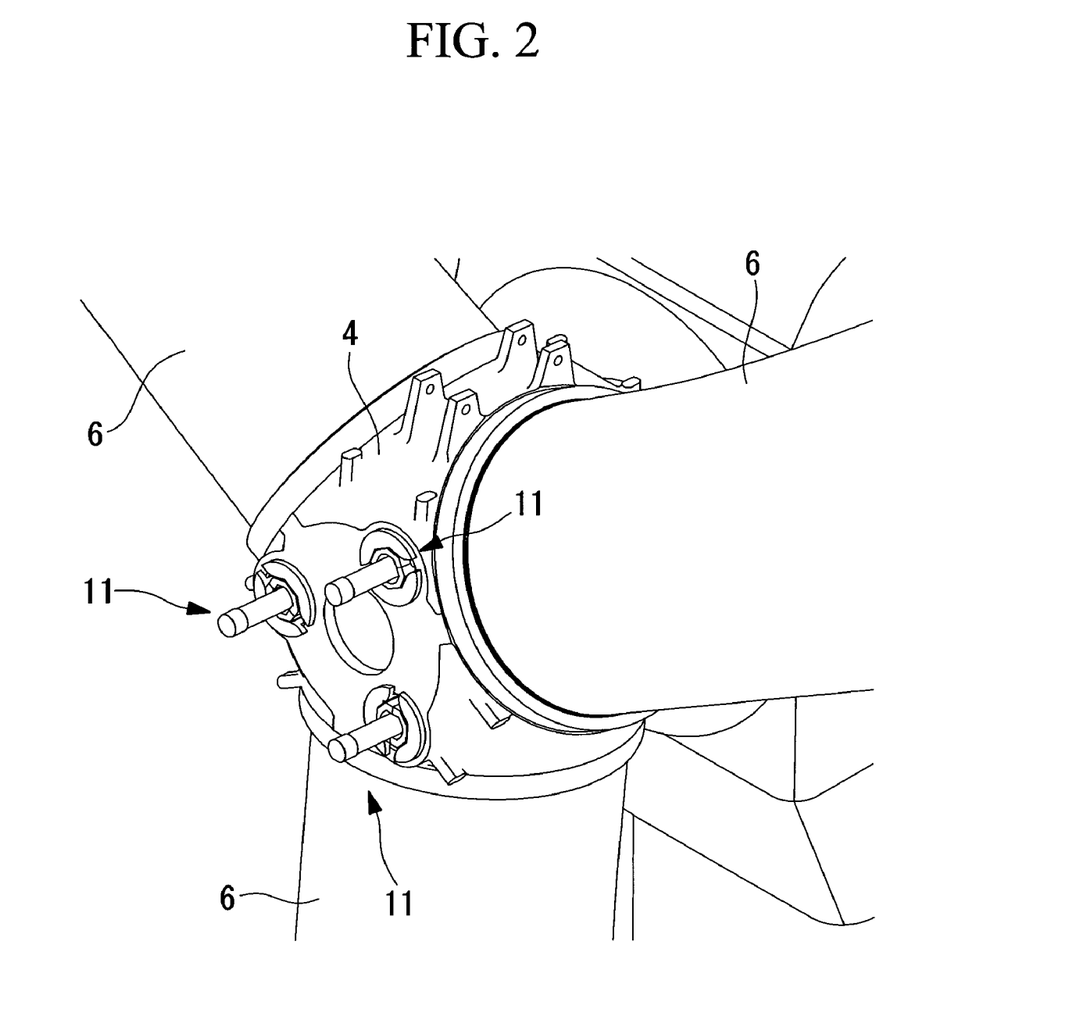
FIG. 2 is a partial enlarged view illustrating the structure of a rotor head in FIG. 1.

FIG. 2 is a partial enlarged view illustrating the structure of the rotor head in FIG. 1.

The rotor head 4, as shown in FIGS. 1 and 2, has the plurality of wind turbine rotor blades 6 attached thereto radially around the rotation axis thereof, and its periphery is covered with the head capsule 5.

The rotor head 4 has pitch actuators 11 corresponding to the individual wind turbine rotor blades 6 on a one-to-one basis to change the pitch angles of the wind turbine rotor blades 6 by rotating the wind turbine rotor blades 6 about the axes of the wind turbine rotor blades 6.

Therefore, when the wind turbine rotor blades 6 receive wind in the rotation-axis direction of the rotor head 4, a force rotating the rotor head 4 about the rotation axis thereof acts on the wind turbine rotor blades 6, thus rotating the rotor head 4.

Figure 3:
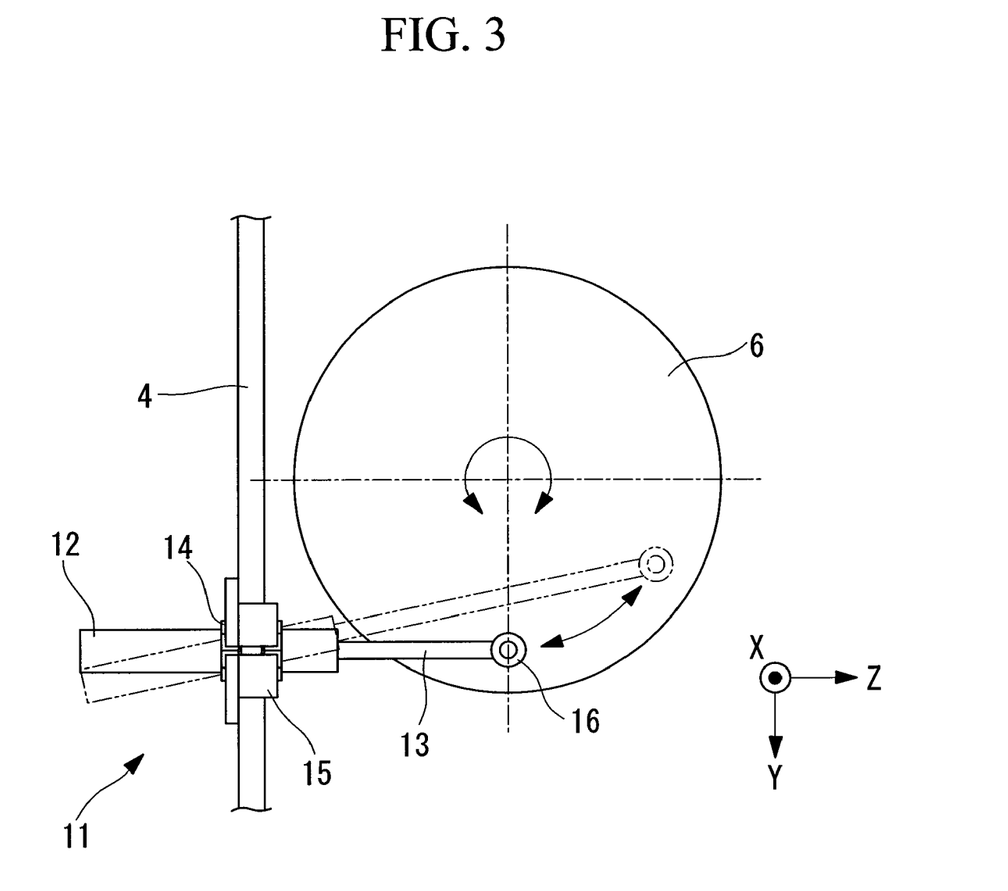
FIG. 3 is a schematic diagram illustrating the positional relationship between pitch actuation units and wind turbine rotor blades in FIG. 2.

FIG. 3 is a schematic diagram illustrating the positional relationship between the pitch actuation units and the wind turbine rotor blades in FIG. 2.

The pitch actuators 11, as shown in FIGS. 2 and 3, are disposed between the rotor head 4 and the wind turbine rotor blades 6 to rotate the wind turbine rotor blades 6 about the axes thereof, thus controlling the pitch angles thereof.

The pitch actuators 11 each include a cylinder 12 and a rod 13 that control the pitch angle by extension and retraction; a first cylinder bearing (cylinder bearing) 14 and a second cylinder bearing (cylinder bearing) 15 disposed between the rotor head 4 and the cylinder 12; and a rod bearing 16 disposed between the wind turbine rotor blade 6 and the rod 13.

Figure 4:
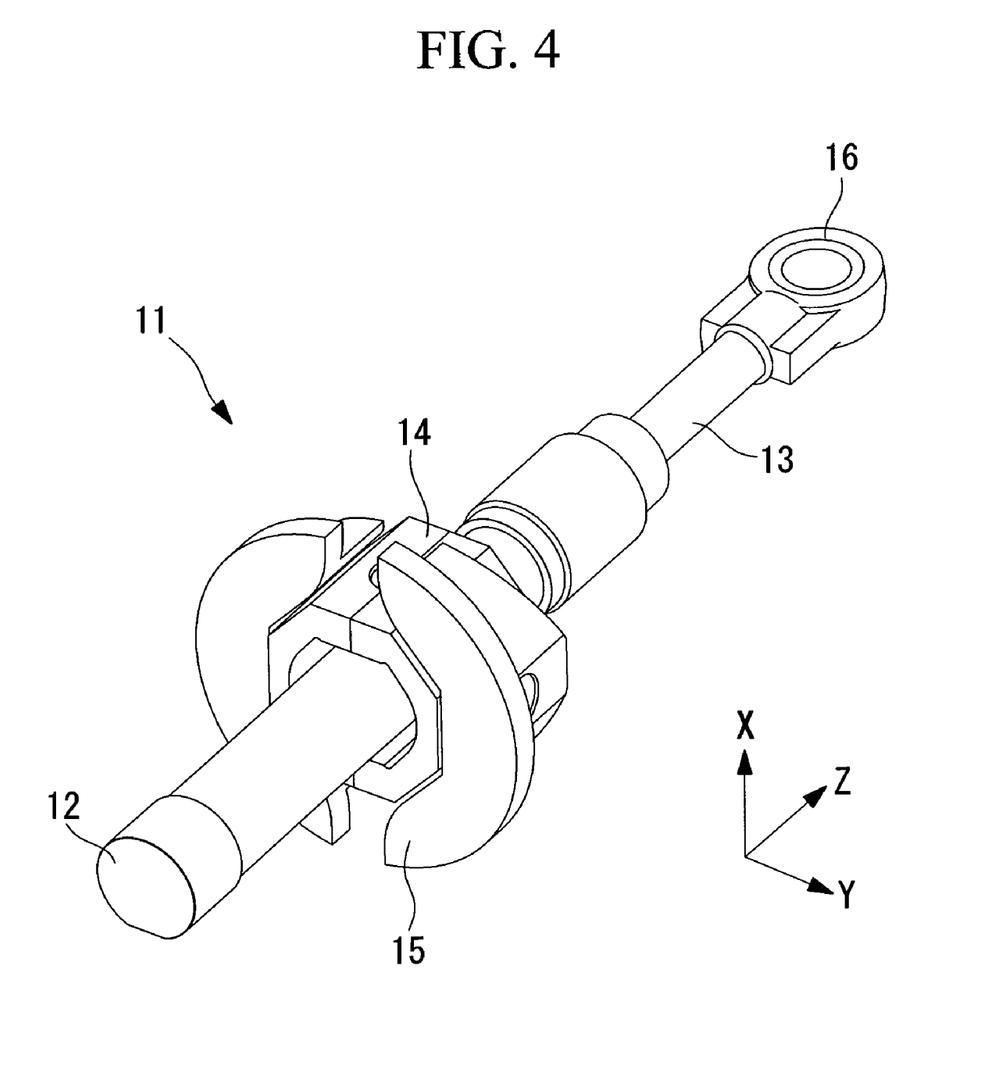
FIG. 4 is a schematic diagram illustrating the structure of the pitch control units in FIG. 2.
Figure 5:
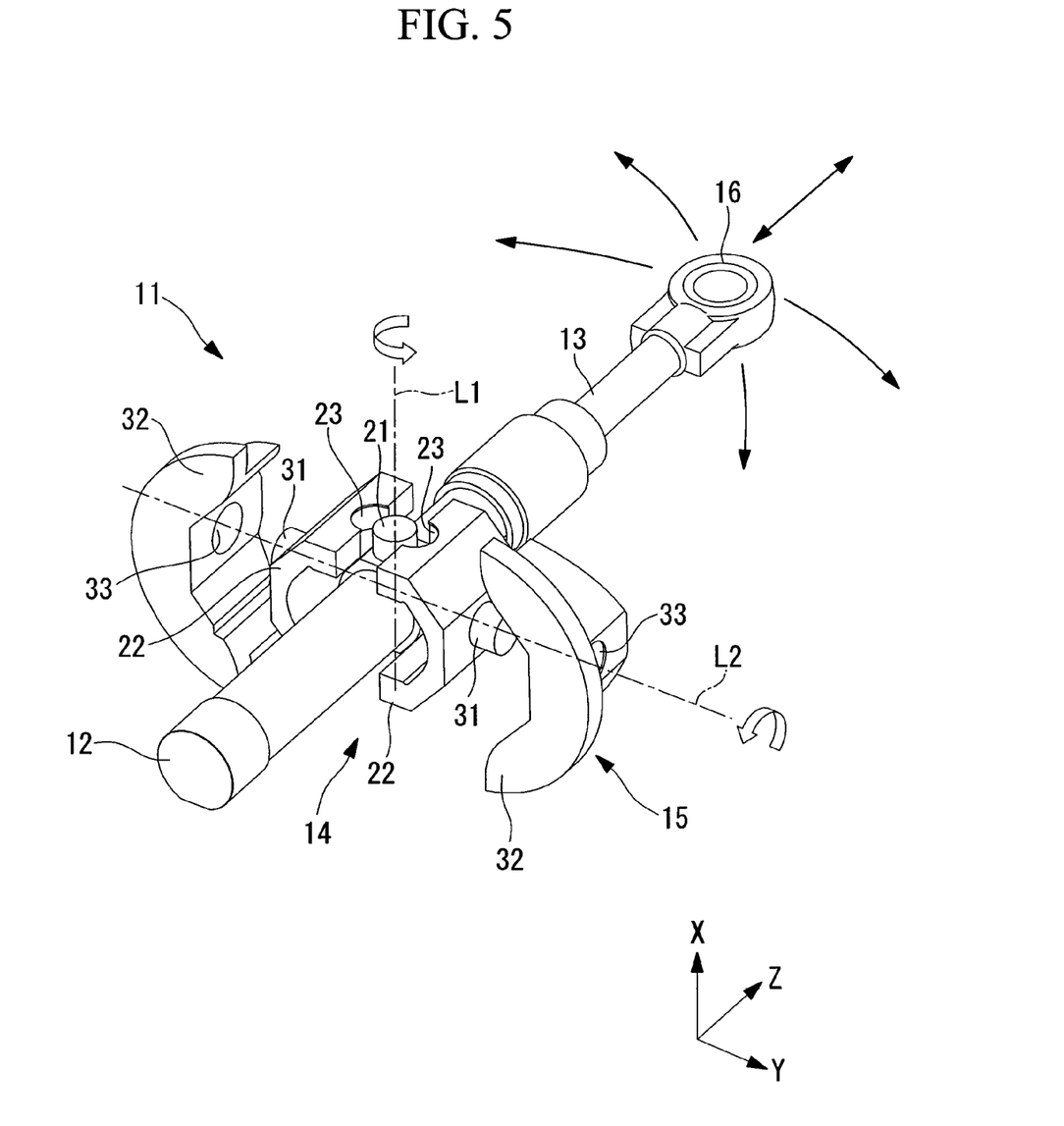
FIG. 5 is an exploded schematic diagram illustrating the structure of the pitch actuation unit in FIG. 4.

FIG. 4 is a schematic diagram illustrating the structure of the pitch control units in FIG. 2, and FIG. 5 is an exploded schematic diagram illustrating the structure of the pitch actuation unit in FIG. 4.

The cylinder 12, as shown in FIGS. 3 to 5, is a cylindrical member accommodating the rod 13 and pushes out and pulls in the rod 13 along the axis of the cylinder 12 as a pressurized fluid such as oil is supplied into the cylinder 12.

The cylinder 12 is disposed in the rotor head 4 together with the first cylinder bearing 14 and the second cylinder bearing 15. In addition, the cylinder 12 is disposed together with the rod 13 so as to extend substantially parallel to a plane substantially parallel to an end surface of the wind turbine rotor blade 6, namely, the Y-Z plane.

The rod 13 is a member formed in a cylindrical shape and is disposed substantially coaxially with the axis of the cylinder 12 so as to be movable linearly along the axis.

The rod bearing 16 is disposed at an end of the rod 13, which is rotatably fixed to the end surface of the wind turbine rotor blade 6 with the rod bearing 16 therebetween. The rod bearing 16 is configured as a spherical bearing to absorb rotation about the X-axis and the Y-axis in the drawings.

The first cylinder bearing 14 is a bearing supporting the cylinder 12 so as to be rotatable about an inner axis (first rotation axis) L1 extending along the axis of the wind turbine rotor blade 6, namely, along the X-axis.

The first cylinder bearing 14, as shown in FIGS. 4 and 5, includes a pair of cylinder trunnions (first trunnions) 21 and a pair of inner brackets (first brackets) 22.

The pair of cylinder trunnions 21 are cylindrical members extending from the cylindrical surface of the cylinder 12 in the axis direction of the wind turbine rotor blade 6, namely, in the X-axis direction.

The pair of inner brackets 22 hold the cylinder 12 and the cylinder trunnions 21 in the positive and negative directions of the Y-axis and support the cylinder 12 so as to be rotatable about the inner axis L1.

Semicylindrical inner recesses 23 are formed in the surfaces of each inner bracket 22 opposite the other inner bracket 22 to accommodate the cylinder trunnions 21. In addition, a gap is formed between the inner brackets 22 and the cylinder 12 to permit rotation of the cylinder 12 about the inner axis L1.

Inner bushings (not shown) are disposed between the inner recesses 23 and the cylinder trunnions 21. The cylinder trunnions 21 are disposed inside the inner bushings, which allow the cylinder trunnions 21 to rotate smoothly.

The second cylinder bearing 15 is a bearing supporting the cylinder 12 and the first cylinder bearing 14 so as to be rotatable about an outer axis (second rotation axis) L2 extending along the Y-axis, which is substantially perpendicular to the inner axis L1.

The second cylinder bearing 15 includes a pair of bracket trunnions (second trunnions) 31 and a pair of outer brackets (second brackets) 32.

The pair of bracket trunnions 31 are cylindrical members extending from the outer surfaces of the inner brackets 22 in the Y-axis direction.

The pair of outer brackets 32 hold the inner brackets 22 and the bracket trunnions 31 in the positive and negative directions of the Y-axis and support the cylinder 12 and the inner brackets 22 so as to be rotatable about the outer axis L2.

Cylindrical outer holes 33 are formed at positions of the outer brackets 32 opposite the bracket trunnions 31 to accommodate the bracket trunnions 31. In addition, a gap is formed between the outer brackets 32 and the inner brackets 22 to permit rotation of the cylinder 12 and the inner brackets 22 about the outer axis L2.

Outer bushings (not shown) are disposed between the outer holes 33 and the bracket trunnions 31. The bracket trunnions 31 are disposed inside the outer bushings, which allow the bracket trunnions 31 to rotate smoothly.

The electricity-generating equipment 7, as shown in FIG. 1, can be exemplified by equipment including a generator that generates electricity when the rotational driving force of the rotor head 4 is transmitted and a transformer that converts the electric power generated by the generator into AC power of predetermined frequency (for example, AC power at 50 Hz or 60 Hz).

Next, a method for generating electricity in the wind turbine generator 1 having the structure described above will be summarized.

The wind turbine generator 1 converts wind power received by the wind turbine rotor blades 6 in the direction of the rotation axis of the rotor head 4 into power rotating the rotor head 4 about the rotation axis.

The rotation of the rotor head 4 is transmitted to the electricity-generating equipment 7, which generates electric power suited to the object to which the electric power is supplied, for example, AC power whose frequency is 50 Hz or 60 Hz.

At least while electricity is being generated, the rotor head 4 is directed windward by appropriately rotating the nacelle 3 in a horizontal plane so that wind force acts effectively on the wind turbine rotor blades.

Next, the control of the pitch angle of the wind turbine rotor blade 6 by the pitch actuator 11 will be described.

The pitch actuator 11, as shown in FIG. 3, rotates the wind turbine rotor blade 6 about the axis thereof by extending the rod 13 from the cylinder 12 and retracting it, thus changing the pitch angle.

For example, if the rod 13 is extended from the cylinder 12, a force rotating the wind turbine rotor blade 6 about the axis thereof acts because the end of the rod 13 is fixed at a distance from the axis of the wind turbine rotor blade 6. As the wind turbine rotor blade 6 rotates about the axis thereof, the first cylinder bearing 14 allows the cylinder 12 and the rod 13 to rotate about the inner axis L1. At the same time, the rod bearing 16 allows the rod 13 and the wind turbine rotor blade 6 to rotate relatively about an axis substantially parallel to the X-axis.

If the rod 13 is retracted into the cylinder 12, on the other hand, the wind turbine rotor blade 6 rotates about the axis thereof, and the first cylinder bearing 14 allows the cylinder 12 and the rod 13 to rotate about the inner axis L1, as in the above case.

Next, a feature of this embodiment, namely, absorption of relative deformation between the root of the wind turbine rotor blade 6 and the rotor head 4 in the pitch actuator 11, will be described.

Figure 6:
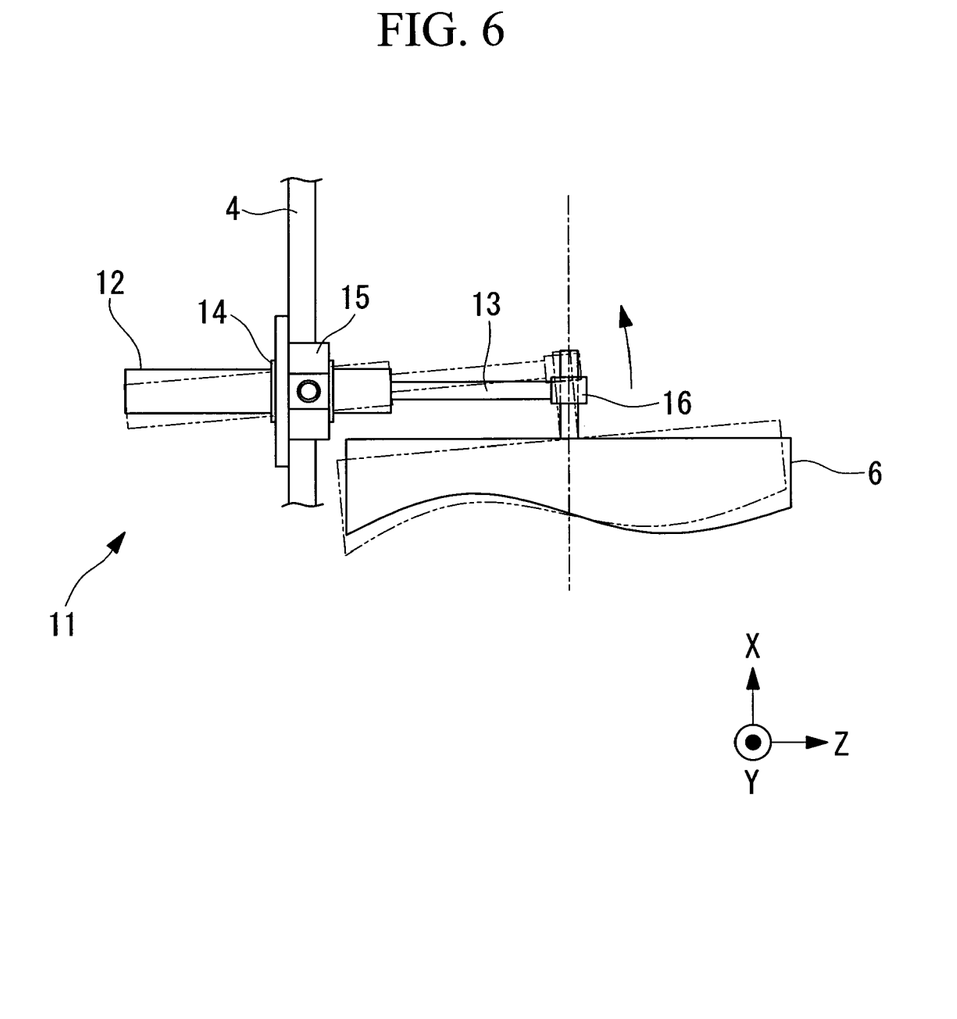
FIG. 6 is a schematic diagram illustrating absorption of deformation of the wind turbine rotor blades and so on in the pitch actuation units in FIG. 2.

FIG. 6 is a schematic diagram illustrating absorption of deformation of the wind turbine rotor blades and so on in the pitch actuation units in FIG. 2.

For example, if a high load acts on the wind turbine rotor blade 6, as in the case of a strong wind force, deformation occurs in, for example, the root of the wind turbine rotor blade 6 and the rotor head 4, as indicated by the dotted lines in FIG. 6. In this case, the deformation occurs so as to rotate the end surface of the wind turbine rotor blade 6 about the Y-axis.

The second cylinder bearing 15 then allows the cylinder 12 and the rod 13 to rotate about the outer axis L2, thus absorbing relative deformation between the root (end surface) of the wind turbine rotor blade 6 and the rotor head 4.

With the above configuration, because the cylinder 12 and the rod 13 are supported so as to be rotatable about the inner axis L1, which is substantially parallel to the axis of the wind turbine rotor blade 6, and about the outer axis L2, which crosses the inner axis L1, a force acting on the cylinder 12 and the rod 13 due to strain occurring at the joint between the rotor head 4 and the wind turbine rotor blade 6 when the wind turbine rotor blade 6 receives wind power is absorbed as the cylinder 12 and the rod 13 rotate about the outer axis L2.

On the other hand, when the cylinder 12 and the rod 13 rotate the wind turbine rotor blade 6 about the axis thereof by extension and retraction to change the pitch angle, the cylinder 12 and the rod 13 rotate about the inner axis L1 as the wind turbine rotor blade 6 rotates.

Accordingly, the first cylinder bearing 14 and the second cylinder bearing 15 can absorb a force acting in such a direction as to bend the cylinder 12 and the rod 13 to prevent accelerated wear of, for example, a seal around the cylinder 12, thus preventing the pitch actuator 11 from losing its reliability.

In addition, the assembly tolerance required for assembly of the pitch actuator 11 of this embodiment can be alleviated.

The cylinder 12 and the rod 13 are supported so as to be rotatable about the inner axis L1 by the first cylinder bearing 14 while the cylinder 12, the rod 13, and the first cylinder bearing 14 are supported so as to be rotatable about the outer axis L2 by the second cylinder bearing 15.

Therefore, a force acting on the cylinder 12 and the rod 13 due to strain occurring at the joint between the rotor head 4 and the wind turbine rotor blade 6 is absorbed as the cylinder 12, the rod 13, and the first cylinder bearing 14 rotate about the outer axis L2. When the pitch angle of the wind turbine rotor blade 6 is changed, on the other hand, the cylinder 12 and the rod 13 rotate about the inner axis L1 as the wind turbine rotor blade 6 rotates.

Because a spherical bearing is used as the rod bearing 16, the force acting in such a direction as to bend the cylinder 12 and the rod 13 is also absorbed between the end of the rod 13 and the wind turbine rotor blade 6 by the rod bearing 16. This more reliably prevents accelerated wear of, for example, the seal around the cylinder 12 and more significantly alleviates the assembly tolerance required for assembly of the pitch actuator 11 of this embodiment.

The invention claimed is:

1. A pitch actuator for a wind turbine generator, comprising:
    a cylinder and a rod that rotate a wind turbine rotor blade about an axis thereof relative to a rotor head to change a pitch angle;
    a cylinder bearing supporting the cylinder, the cylinder bearing surrounding along an outer circumference of the cylinder, so as to be rotatable relative to the rotor head about a first rotation axis extending substantially parallel to the axis of the wind turbine rotor blade and about a second rotation axis extending in a direction crossing both the first rotation axis and the axis of the cylinder and the rod; and
    a rod bearing rotatably supporting an end of the rod on an end surface of the wind turbine rotor blade.

2. The pitch actuator for a wind turbine generator according to claim 1, wherein the cylinder bearing comprises:
    a first cylinder bearing including first trunnions extending from the cylinder substantially parallel to the first rotation axis and first brackets rotatably supporting the first trunnions; and
    a second cylinder bearing including second trunnions extending from the first brackets substantially parallel to the second rotation axis and second brackets rotatably supporting the second trunnions.

3. The pitch actuator for a wind turbine generator according to claim 1, wherein the rod bearing is a spherical bearing.

4. A wind turbine generator comprising:
    a plurality of wind turbine rotor blades that receive wind power;
    a rotor head that supports the wind turbine rotor blades so as to be rotatable about the axes thereof and that are rotated by the wind turbine rotor blades;
    pitch actuators according to: a cylinder and a rod that rotate a wind turbine rotor blade about an axis thereof relative to a rotor head to change a pitch angle;
    a cylinder bearing supporting the cylinder, the cylinder bearing surrounding along an outer circumference of the cylinder, so as to be rotatable relative to the rotor head about a first rotation axis extending substantially parallel to the axis of the wind turbine rotor blade and about a second rotation axis extending in a direction crossing both the first rotation axis and the axis of the cylinder and the rod; and
    a rod bearing rotatably supporting an end of the rod on an end surface of the wind turbine rotor blade; and
    electricity-generating equipment that generates electricity as the rotor head rotates.

5. The pitch actuator for a wind turbine generator according to claim 4, wherein the cylinder bearing comprises:
    a first cylinder bearing including first trunnions extending from the cylinder substantially parallel to the first rotation axis and first brackets rotatably supporting the first trunnions; and
    a second cylinder bearing including second trunnions extending from the first brackets substantially parallel to the second rotation axis and second brackets rotatably supporting the second trunnions.

6. The pitch actuator for a wind turbine generator according to claim 4, wherein the rod bearing is a spherical bearing.

* * * * *